(12) United States Patent
Williamson et al.

(10) Patent No.: US 7,558,216 B2
(45) Date of Patent: Jul. 7, 2009

(54) NETWORK CONNECTION CONTROL

(75) Inventors: Matthew Murray Williamson, Palo Alto, CA (US); Andrew Patrick Norman, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 531 days.

(21) Appl. No.: 11/048,126

(22) Filed: Feb. 1, 2005

(65) Prior Publication Data
US 2005/0185668 A1    Aug. 25, 2005

(30) Foreign Application Priority Data
Feb. 21, 2004    (GB) .................................. 0403931.9

(51) Int. Cl.
*G01R 31/08* (2006.01)
(52) U.S. Cl. .................... 370/254; 709/224; 726/26
(58) Field of Classification Search ........... None
See application file for complete search history.

(56) References Cited

U.S. PATENT DOCUMENTS

| | | | |
|---|---|---|---|
| 5,787,244 A * | 7/1998 | Hiratsuka et al. ............. 714/16 |
| 6,792,474 B1 * | 9/2004 | Hopprich et al. ............. 709/245 |
| 6,934,374 B2 * | 8/2005 | Muranaka .................... 379/196 |
| 7,296,274 B2 * | 11/2007 | Cohen et al. ................. 719/315 |
| 7,325,065 B1 * | 1/2008 | Watkins ....................... 709/229 |
| 7,355,996 B2 * | 4/2008 | Hrastar ........................ 370/328 |
| 2003/0145225 A1 | 7/2003 | Bruton, III et al. |
| 2003/0200464 A1 * | 10/2003 | Kidron ........................ 713/201 |
| 2004/0093521 A1 * | 5/2004 | Hamadeh et al. ............. 713/201 |
| 2004/0120260 A1 * | 6/2004 | Bernier et al. ............... 370/252 |
| 2004/0215750 A1 * | 10/2004 | Stilp ........................... 709/220 |
| 2004/0233849 A1 * | 11/2004 | Cole ........................... 370/238 |
| 2006/0075084 A1 * | 4/2006 | Lyon ........................... 709/223 |
| 2007/0192870 A1 * | 8/2007 | Lynn et al. .................... 726/26 |

FOREIGN PATENT DOCUMENTS

WO    WO 03/100616 A1    12/2003

* cited by examiner

*Primary Examiner*—Phirin Sam

(57) ABSTRACT

A method and apparatus for controlling communications in a data network comprises detecting a request to initiate communication between a data processor and the network and determining if the communication request is abnormal and if so, controlling the data processor to degrade the resulting communication.

22 Claims, 3 Drawing Sheets

NETWORK CONNECTION CONTROL

Figure 1:
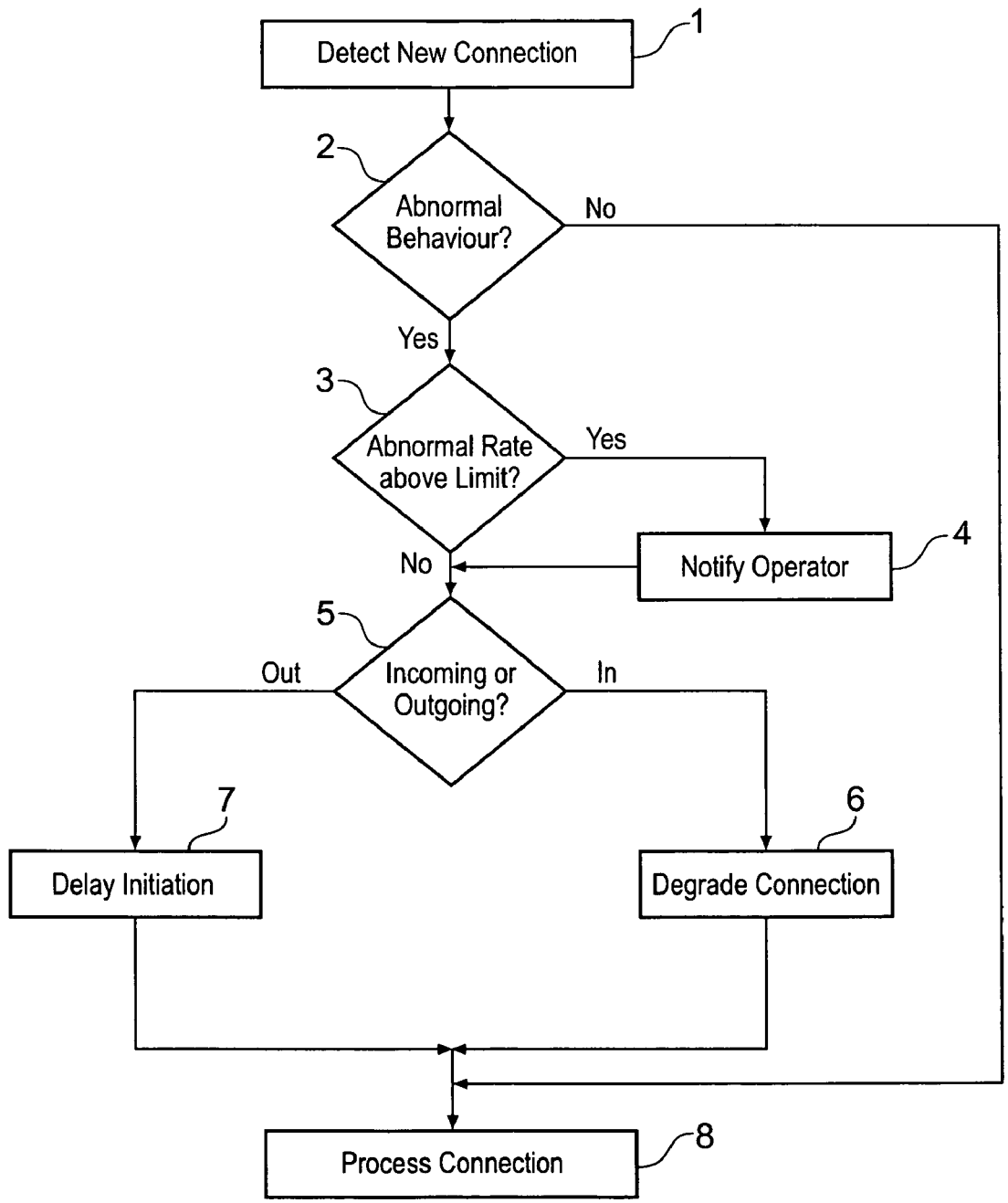

The present invention relates to the unauthorised or malicious access to a network of interconnected data processors and more particularly to minimising or preventing such unauthorised access.

It is almost inevitable that a data processor, for example in the form of a computer, will at some point during its life be interconnected with one or more other data processors. The most common occurrences of this are on the one hand within an Intranet of a commercial organisation or on the other hand as part of the Internet. An inevitable result of the data processor being connected to other such data processors is that the opportunities for the propagation of malicious software or unauthorised access to the data processor in question arise and are enhanced. From a commercial user's point of view, such unauthorised access to the user's data processor and network is at best a gross inconvenience due to the amount of time and effort required to repel the access or correct the damage generally caused by such an access, and at worst is highly damaging as a result of stolen or corrupted data. Even from a domestic user's point of view, the unauthorised access to the data processor, or computer, is both disrupting and distressing. Consequently, apparatus and methods to prevent the unauthorised intrusion to computer networks have been developed.

Network intrusion detection systems generally operate by monitoring the network traffic, i.e. the communications between interconnected data processors, to look for patterns that correspond to malicious access or attacks. These prior art systems tend to fall into two general types; those that use signatures to detect known patterns characteristic of malicious software, and those that attempt to learn the "normal" behaviour of the computer system and to detect any anomalies in the behaviour. Those systems that rely on detecting known patterns are by their very nature incapable of detecting a genuinely new mode of attack or intrusion.

However, since the second approach of detecting anomalies in the behaviour of a computer system requires a preferably ongoing period of learning, it is prone to making mistakes. These mistakes fall into two general categories; missing real intrusions (false negatives) and false alarms (false positives). These two types of mistakes are generally related in that if the sensitivity of the intrusion detection system is increased to reduce the rate of false negatives, the rate of false positives increases correspondingly. False alarms (false positives) are problematic because the main response used by these intrusion detection systems is to alert an operator to the suspecting intrusion, and thus correspond to a waste of the operator's time. If too many false alarms are generated the amount of operator time required to deal with them effectively makes the system unusable. Alternatively, it is human nature to wish to avoid having to deal with a large number of false alarms with the consequence that sensitivity of such systems tends to be set too low.

A further consequence of contacting an operator is that the human response is often too late, occurring after the attack or intrusion has occurred and damaged the computer system. Involvement of the operator may be reduced by using an automatic system, but since most of the responses implemented by such automatic systems are relatively drastic, for example switching off the computer, or killing the connection session etc., false alarms tend to result in poor system performance.

According to a first aspect of the present invention there is provided a method of controlling communications in a data network, the method comprising detecting a request to initiate communication between a data processor and the data network; determining if the communication request is abnormal and if so controlling the data processor so as to degrade the resultant communication between the data processor and the data network.

The degrading of the communication preferably comprises, in response to the communication request being issued by the data processor, delaying the execution of the communication request. Additionally or alternatively, the method further comprises, in response to the communication request being received from a further data processor, reducing the transmission rate of the resultant communication, i.e. effectively reducing the bandwidth of the connection.

The data processor may be arranged to transmit and receive data via a network connection in accordance with a network protocol and the step of degrading the communication comprises modifying the network protocol instructions.

The network protocol may include the exchange of a plurality of handshake signals between the data processor and the data network and the step of modifying the network protocol instructions preferably comprises delaying and/or deleting at least one of the handshake signals.

Additionally or alternatively, the network protocol may include the transmission of data packets and the modification of the network protocol instructions may therefore comprise delaying and/or deleting at least one data packets. Additionally, the network protocol may further include the transmission by a data processor of a packet acknowledgement signal in response to the receipt of a data packet by the data processor and the step of modifying the network protocol instructions may therefore comprise delaying and/or deleting the packet acknowledgement signal. Additionally or alternatively, the step of modifying the network protocol instructions may comprise reducing the size of the data packets.

The method may further comprise determining the number of abnormal communication requests within a period of time and providing a notification to a user if the number of abnormal requests within the time period exceeds a threshold value. The threshold value may be set by a user or may be automatically set by the data processor.

Additionally or alternatively, on detection of an abnormal communication request a user may be prompted for authorisation to allow the connection request to be processed.

According to a second aspect of the present invention there is provided a data processor for use with a data network, the data processor comprising: network communication apparatus arranged to enable communication between the data processor and a data network; network communication monitoring apparatus arranged to detect a request to initiate communication between the data processor and the data network and to determine if the communication request conforms to one or more communication parameters; and communication control means arranged, in response to the detection of a communication request that does not conform to the at least one communication parameter, to degrade the resultant communication between the data processor and the data network.

The network monitoring apparatus is preferably arranged to determine if the detected communication request is generated by the data processor and if so to provide a first notification to the communication control means, otherwise provide a second notification to the communication control means. Thus the network communication monitoring means is capable of distinguishing between internal and external communication requests. Additionally, in response to the first notification provided by the network communication monitoring apparatus the communication control means may be arranged to delay the establishment of the requested communication.

Additionally or alternatively, in response to the second notification provided by the network communication monitoring apparatus, the communication control means may be arranged to reduce the transmission rate of the resultant communication.

The communication control means may be arranged to operate in accordance with a network protocol and to delay the successful communication by manipulation of the protocol instructions. Preferably, the network protocol comprises a protocol stack and the communication control means comprises a shim within the protocol stack.

The network protocol may include the exchange of a plurality of handshake signals between the data processor and the data network and the protocol shim maybe arranged to delay and/or delete at least one of the handshake signals. Additionally or alternatively, the network protocol may include the transmission of data in data packets and the protocol shim may therefore be arranged to delay and/or delete at least one of the data packets. Additionally, the network protocol may further include the transmission of a packet acknowledgement signal in response to the receipt by a data processor of a data packet and the protocol shim may therefore be arranged to delay and/or delete a packet acknowledgement signal.

Additionally or alternatively, the protocol shim maybe arranged to reduce the size of the data packets.

The network communication monitoring apparatus may be arranged to generate a user notification if the number of detected communication requests failing to conform with the communication parameter in a given time period exceeds a threshold value.

The network communication monitoring apparatus may be arranged to periodically update the connection criteria.

Figure 2:
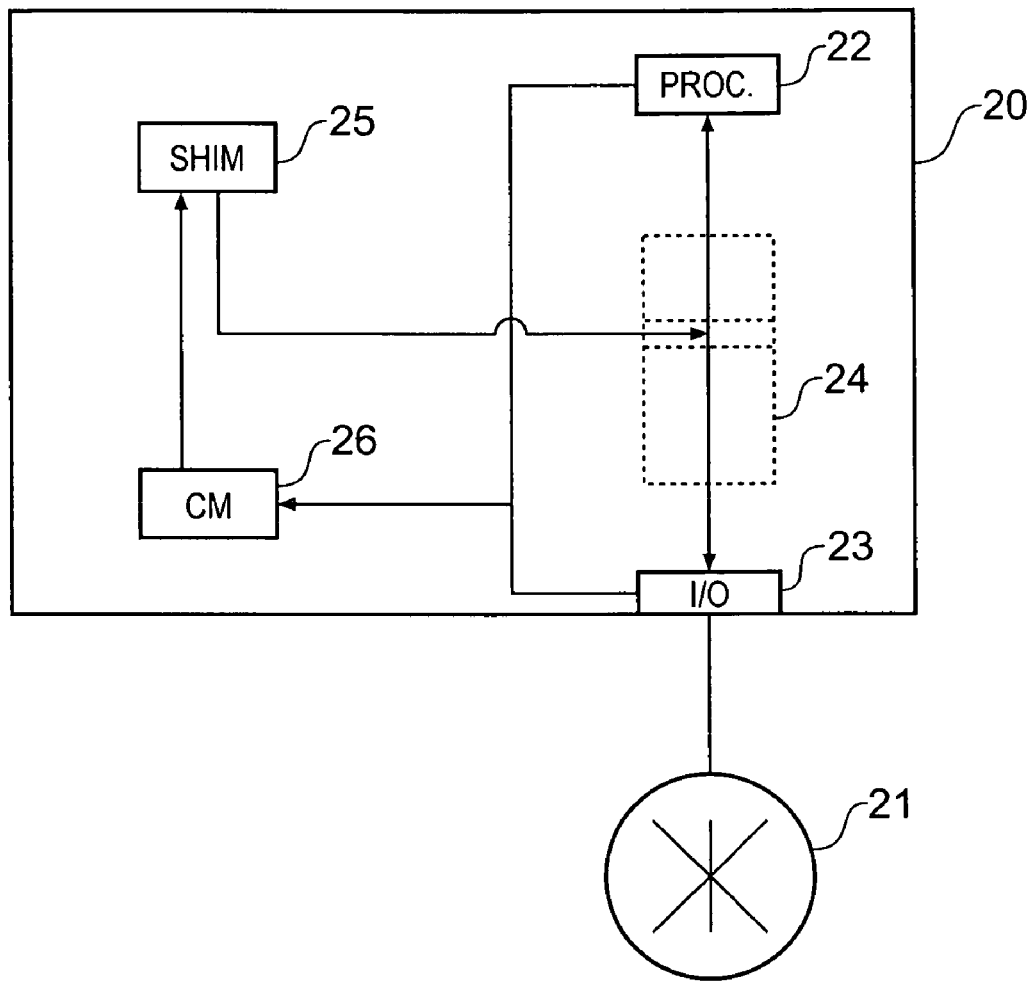
Figure 3:
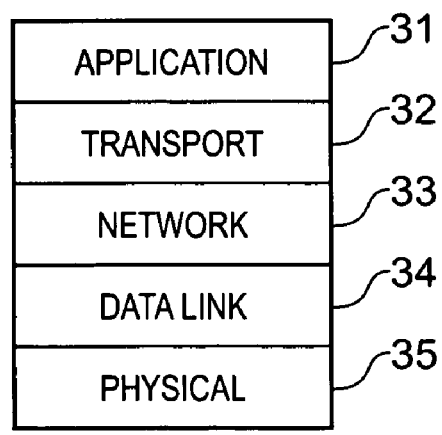
Figure 4:
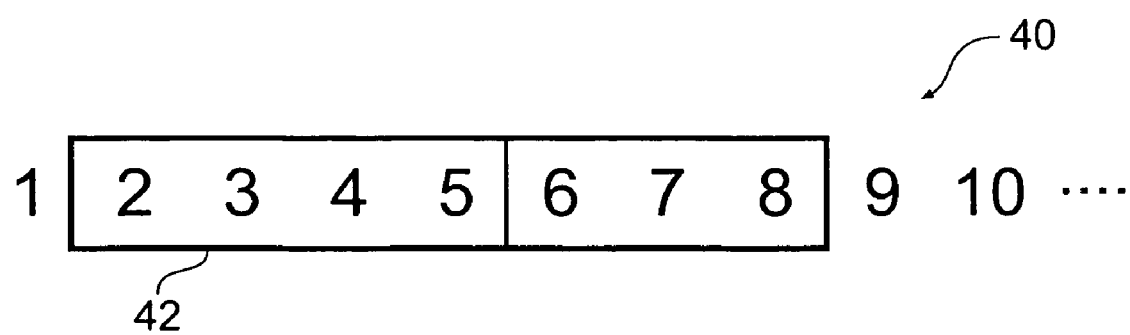

An embodiment of the present invention is described hereinafter, by way of illustrative example only, with reference to the accompanying figures, of which:

FIG. 1 schematically illustrates a method of intrusion detection according to an embodiment of the present invention;

FIG. 2 schematically illustrates an intrusion detection system according to an embodiment of the present invention;

FIG. 3 schematically illustrates a network protocol stack for a TCP/IP network;

FIG. 4 schematically illustrates a TCP transmission window; and

Figure 5:
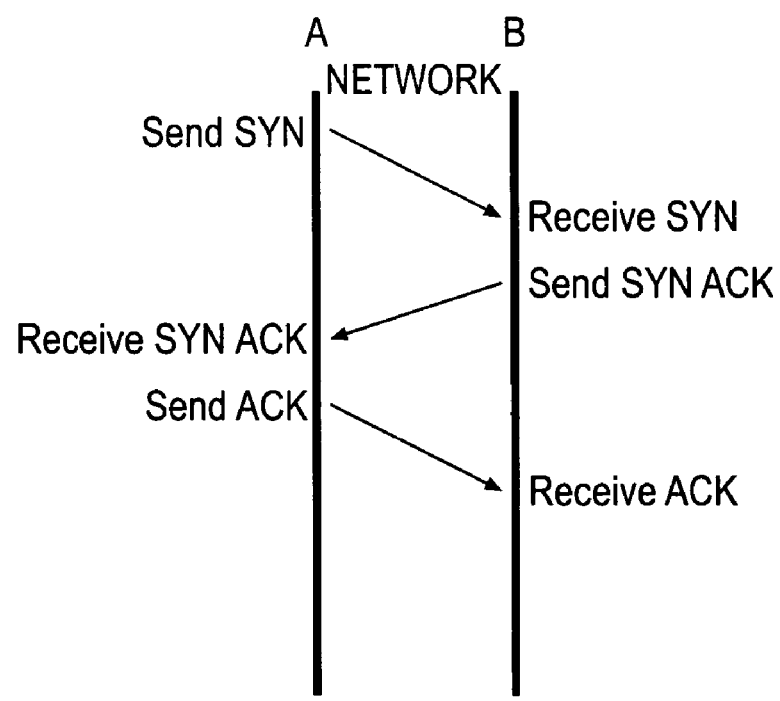

FIG. 5 schematically illustrates a TCP handshake process.

A characteristic of network intrusion detection systems as known in the prior art is that they are essentially binary in their responses. The two effective responses available to such systems are to either allow a network operation to continue, or alternatively to prevent it. Prevention of the network operation may be absolute, such as a network connection being automatically terminated in response to a suspected unauthorised intrusion, or alternatively simply suspended whilst an operator is notified of the suspected intrusion and further instructions requested from the operator. It is this absolute response to a suspected intrusion that results in false positives (false alarms) in such systems having a severe impact on the operation and productivity of the computer system involved.

In embodiments of the present invention a contrasting approach is employed in which the responses to a possible unauthorised intrusion to the computer system are benign in their nature rather than absolute. In the context of this specification, a benign response is one that impedes a suspected unauthorised operation but ultimately does not completely prevent it. An advantage of such benign responses is that they can be set to occur automatically safe in the knowledge that even if the response turns out to be a false alarm there are no significant or lasting detrimental effects. This is in comparison to prior art systems in which the responses tend to be much more drastic, e.g. the termination of a communication session. According to embodiments of the present invention each discrete data processor, or computer, within a computer network includes a monitoring and detection system that monitors the network traffic in and out of that particular computer and detects when an anomalous connection is initiated. If such an anomalous connection is detected, the computer responds in a benign manner. For example, if the connection is outgoing, the computer may delay the initiation of the connection, whereas if the connection is incoming the bandwidth of the connection may be reduced so as to slow down the incoming transmission.

The rate of abnormal behaviour is also monitored by the system. If the occurrences of abnormal behaviour are low the system still responds in a benign manner as explained above, but no other action is taken so that the abnormal behaviour is permitted, albeit at reduced efficiency. The rationalisation behind this mode of operation is that the detected abnormal behaviour may be entirely genuine and not representative of an unauthorised access to the system but is nonetheless outside the usual operating behaviour of the computer system. Consequently, there is no justification for preventing the behaviour or notifying an operator. Furthermore, a low rate of abnormal behaviour detection may also be indicative of a false positive, or false alarm. In this case, although the efficiency of the system is reduced by the behaviour of the intrusion detection system, ultimately the computer system continues to operate and the users are not made aware of the detection of the false alarm.

On the other hand, if the rate of detection of abnormal behaviour exceeds a particular threshold level, this is more likely to be indicative of unauthorised access to the computer system, either by an unauthorised user or by a piece of malicious software, such as a computer virus. In this instance a designated operator will be notified of the high rate of abnormal behaviour, thus allowing a further remedial action to be taken under the control of the computer operator.

A mode of operation according to an embodiment of the present invention is illustrated in FIG. 1. On detection of a new network connection to the data processor, represented at step 1, the intrusion detection system determines if the connection represents abnormal behaviour. This is performed at step 2 in FIG. 1. If the behaviour is determined to be abnormal, a subsequent step, step 3, is for the intrusion detection system to determine if the rate of abnormal behaviour is above or below a threshold level. If the rate of abnormal behaviour detected by the system is above the threshold level the computer operator is notified at step 4. If on the other hand, the rate of abnormal behaviour is below the threshold level the intrusion detection system subsequently determines if the new connection is an incoming connection or an outgoing connection. This is determined at step 5 in FIG. 1. If the new connection is an incoming connection the intrusion detection system manipulates the data received from the new connection such that the apparent bandwidth of the connection is reduced. This occurs at step 6 in FIG. 1. A possible mechanism for reducing the apparent bandwidth is explained in more detail below. If on the other hand, the new connection is determined to be an outgoing connection then the intrusion detection system delays the actual initiation of the connection by direct control of the connection initiation. This is represented at step 7 in FIG. 1. Having either delayed the connection initiation or degraded the incoming connection, the intrusion detection system allows the connection procedure to continue, step 8. If initially the intrusion detection system determines that the new connection does not determine abnormal behaviour, the connection is processed immediately.

A physical implementation of an intrusion detection system according to an embodiment of the present invention is illustrated in FIG. 2. An individual data processor 20, or computer, is illustrated connected to a network 21. The data processor 20 includes a main processing unit 22 that is responsible for the execution of the majority, if not all, of the tasks assigned to the data processor 20. The main processor 22 controls communication between the data processor 20 and the network 21 by means of an input/output unit 23. Communication between the data processor 20 and the network 21 is accomplished in accordance with a network stack 24. As explained in more detail below, the network stack 24 is a layered group of protocols that controls the passage of data between the data processor 20 and the network 21. The protocols comprising the network stack 24 are in fact stored in a memory unit (not shown) accessible by the main processor 22. However, for ease of explanation it is expedient to consider the network stack as a physical entity. Also included in the data processor 20 is a response shim 25 that comprises a further processor arranged to modify the behaviour of the network stack 24 to delay the initiation of outgoing communications and reduced the apparent bandwidth of incoming communications, as required. The response shim 25 is controlled by a communications monitor 26 that is arranged to monitor the behaviour of the main processor 22 and incoming communications received at the input/output unit 23 so as to learn the normal behaviour of the data processor 20 and the network 21 and to control the response shim 25 accordingly. The communications monitor 26 may comprise a separate unit, as shown, including a further processor and memory unit or alternatively may be integrally implemented by the main processor 22, as may the response shim. The communications monitor 26 is capable of learning the normal activity profile of both the user and the data processor. The learning process may occur over a fixed initial period during which the user is prompted after every communication request to indicate whether this is a usual or unusual activity. However, a preferred mode of learning involves maintaining a continuously updated record of each request and determining whether or not they are abnormal or unusual from various parameters, such as the frequency with which requests are made, the data types most often accessed, the time of day, and other such attributes. The precise learning model of the communications monitor is not particularly germane to the present invention and is therefore not discussed in any further detail herein.

To explain the functioning of the response shim 23 mentioned above with reference to FIG. 2, it is useful to expand on the conventional models that a majority of networks adhere to and operate by. One model that is generally common to most networks, and in particular to those networks that make use of public connections, such as the Internet, is the TCP/IP network model. This model is illustrated in FIG. 3 and is a five tiered column, with the user sitting at the top and whatever the user is communicating with at the top of another, identical, column. The top layer is the application layer. This enables the applications, and hence the computer user, to access the network and generates the messages that are to be sent by the network communication link. The next layer is the transport layer that ensures that the entire message goes from source to destination. When referring to the transport layer, source to destination is application to application, not computer to computer. It is at this level that one or more protocols, such as TCP (Transport Control Protocol), IP (Internet Protocol) and UDP (User Datagram Format) protocols operates. These protocols create segments, or user datagrams, and add information, such as process port addresses, to identify the receiver of the packets of data. The next level is the network level which is responsible for the source to destination of the individual packets. This is in contrast to the transport level, which is responsible for the entire message. The next level is the data link level which is responsible for breaking the packets down into individual frames. This layer controls error checking, flow control and node-to-node delivery of the frames. The final bottom level is the physical layer where the frames are translated into physical pulses of electricity or energy waves to effect the actual transmission.

As mentioned above, one of the protocols used in the transport layer is TCP. TCP creates "segments" or "user datagrams" by taking the information from the application layer and adding a header to it. Part of the added header identifies the recipient of the data packets in terms of a specific port in the recipient computer. Consequently, TCP enables program to program communication, rather than machine to machine, by opening up a stream or virtual circuit between respective ports, which begins by alerting the receiver to expect information and ends by an explicit termination signal. Since every segment received is answered with an acknowledgement, TCP is a reliable stream delivery service. This means that the information is "guaranteed" to arrive, or an error will be returned. If an acknowledgement is not received by the sending TCP layer, the data packet in question is resent until an acknowledgement is received. The size of the data packet sent is dictated by the "window size" that is specified in the header information. A schematic representation of a TCP transmission window is shown in FIG. 4. TCP keeps track of the data stream 40 by sliding the transmission window, which tracks the octets. The data stream comprises a sequence of octets, each octet being 8 bytes. The data stream 40 and transmission window 42 in FIG. 4 is representative of the data stream on the senders side, and therefore represents what octets have been sent and acknowledged by the receiver, in this case 1, which octets have been sent but not acknowledged yet, 2 to 5, the octets that are in the process of being sent, 6 to 8, and the octets that it will send when the sliding window has moved on 9+. If nothing changes, then 6 to 8 will be sent and then the sender will halt transmission, having reached the end of the window. More likely, the receiver will have acknowledged some octets by then, and the entire window will slide on down the stream. As alluded to previously, the window size is not constant. Included with every acknowledge that the receiver sends is a window advertisement that specifies how many additional octets the receiver is prepared to accept. This causes the senders window size to increase, with the opposite occurring if the receiver specifies a decreased window advertisement. The window advertisement varies as a function of the number of packets that are not successfully transmitted at the first attempt.

In embodiments of the present invention, the response shim 23 is preferably inserted to the network stack between the transport level 32 and network 33, so that it is able to manipulate the TCP data packets after they have left the TCP transport level, in the case of an outgoing transmission, and before the TCP layer receives an incoming data packet. In this way, the response shim is able to manipulate the data packets to overcome the TCP layers inbuilt mechanisms that would ordinarily overcome the efforts of the response shim. For example, to delay the initiation of a new outgoing connection, the response shim may, for example, manipulate the signals sent and/or received during the initial handshake that occurs when TCP sets up a connection. This handshaking procedure is illustrated in FIG. 5. A and B represent the two parties between which it is desired to communicate, with A being the party initiating the communication. The first step in the handshake procedure is for A to send a synchronisation request SYN to B. On receipt of the synchronisation request B sends a synchronisation acknowledgement SYN ACK to A. On receipt of this, A sends a further acknowledgement ACK to B. Only when B receives the acknowledgement from A is the handshake complete and communication can commence. Hence the response shim 23 can delay initiation of a communication by deleting either or both of the SYN and ACK messages sent to the other party, or by deleting the SYN ACK received from the other party. With regards to incoming connections, the response shim can again either simply delete incoming packets, thus forcing their retransmission, or may delete the acknowledgement signal issued in response to the receipt of a data packet, again forcing the retransmission of that data packet. Another delay mechanism that the response shim can employ is to simply delay the transmission or receipt of any of the SYN, SYN ACK, or ACK signals. The TCP protocol tolerates a delay of the order of a number of seconds for the expected receipt of the handshake signals before retransmission occurs. Thus the response shim may delay the transmission or actual receipt of these signals by a period of time less than the TCP tolerated delay without causing retransmission of those signals. By manipulating the received data packets such that it appears that a significant number are not successfully received, the TCP layer may be forced to reduce the window size, thus reducing the overall transmission rate. Alternatively, the response shim may manipulate the window advertisement issued by the TCP layer to specify that the window size is reduced.

In the embodiments described above the operation of the response shim and the imposed delay in the initiation or receipt of data via a network connection is achieved automatically, with a operator only being informed if the rate of detected abnormal behaviour is above a certain threshold level. However, in other embodiments a higher level of user intervention may be applied. For example, when abnormal behaviour is detected the user may be notified and requested for further authorisation to allow the process to continue. The authorisation may be the user's normal system access password or may be some further prearranged password. The operation of the system is halted, or delayed, by the response shim until the password is entered. Alternatively, the process may be halted for a predetermined period of time, with the option provided for the user to enter a password to terminate the timed delay. A further example of additional authorisation may be requiring a user to enter a password that is displayed on the screen to them at the time of request, or to contact a third party, such as a system administrator, to request the required password.

When an abnormal process is detected, the notification will preferably be sent to the user associated with that process. In the case of UNIX systems, this is given by the user ID attribute associated with any given process. However, where the process is initiated in response to a further automated process, such as background network activity, or the operation of virus detection software, the user is simply identified as that automated process. In this instance, a designated human operator may be contacted, individual operators being assigned to one or more automated processes.

It is therefore possible using embodiments of the present invention to provide an intrusion detection system that responds in a benign manner to detected intrusions to a computer system, such that the level of user intervention is not excessive. Additionally, the response is required by users are also benign and are designed to cause a minimum of disturbance to authorised users, yet impede the operations of unauthorised or malicious users.

The invention claimed is:

1. A method controlling communications in a data network, the method comprising:
    detecting a request to initiate communication between a data processor and the data network;
    determining if the communication request is abnormal and if so controlling the data processor so as to delay the resultant communication between the data processor and the data network,
    wherein the step of delaying the communication comprises, in response to the communication request being issued by the data processor, automatically delaying the execution of the communication request.

2. A method controlling communications in a data network, the method comprising:
    detecting a request to initiate communication between a data processor and the data network;
    determining if the communication request is abnormal and if so controlling the data processor so as to delay the resultant communication between the data processor and the data network,
    wherein the step of delaying the communication comprises, in response to the communication request being received from a further data processor, automatically reducing the transmission rate of the resultant communication.

3. The method of claim 1, wherein the data processor is arranged to transmit and receive data via a network connection in accordance with a network protocol and the step of delaying the communication comprises modifying the network protocol instructions.

4. The method of claim 3, wherein the network protocol includes the exchange of a plurality of handshake signals between the data processor and the data network and the step of modifying the network protocol instructions comprises at least one of delaying and deleting at least one of the handshake signals.

5. The method of claim 3, wherein the network protocol includes the transmission of data in data packets and the step of modifying the network protocol instructions comprises at least one of delaying and deleting at least one data packet.

6. The method of claim 5, wherein the network protocol farther includes the transmission by a data processor of a packet acknowledgement signal in response to the receipt of a data packet by the data processor and the step of modifying the network protocol instructions comprises at least one of delaying and deleting the packet acknowledgement signal.

7. The method of claim 5, wherein the step of modifying the network protocol instructions comprises reducing the size of the data packets.

8. A method controlling communications in a data network, the method comprising:
    detecting a request to initiate communication between a data processor and the data network;
    determining if the communication request is abnormal and if so controlling the data processor so as to delay the resultant communication between the data processor and the data network,
    wherein the method further comprises determining the number of abnormal communication requests within a period of time and providing a notification to a user if the number of abnormal communication requests within the time period exceeds a threshold value.

9. A method controlling communications in a data network, the method comprising:
   detecting a request to initiate communication between a data processor and the data network;
   determining if the communication request is abnormal and if so controlling the data processor so as to delay the resultant communication between the data processor and the data network,
   wherein the step of delaying the communication comprises delaying processing of the communication request pending authorisation from a human user.

10. A data processor for use with a data network, the data processor comprising:
   network communication apparatus arranged to enable communication between the data processor and a data network;
   network communication monitoring apparatus arranged to detect a request to initiate communication between the data processor and the data network and to determine if the communication request conforms to one or more communication parameters; and
   communication control means arranged, in response to the detection of a communication request that does not conform to the at least one communication parameter, to delay the resultant communication between the data processor and the data network,
   wherein the network communication monitoring apparatus is arranged to determine if the detected communication request is generated by the data processor and if so provide a first notification to the communication control means, otherwise provide a second notification to the communication control means.

11. A data processor according to claim 10, wherein in response to the first notification provided by the network communication monitoring apparatus the communication control means is arranged to delay the establishment of the requested communication.

12. A data processor according to claim 10, wherein in response to the second notification provided by the network communication monitoring apparatus, the communication control means is arranged to delay the resultant communication by reducing its transmission rate.

13. A data processor according to claim 10, wherein the communication control means is arranged to operate in accordance with a network protocol and to delay the resultant communication by manipulation of the protocol instructions.

14. A data processor according to claim 13, wherein the network protocol comprises a protocol stack and the communication control means comprises a protocol shim within the protocol stack.

15. A data processor according to claim 14, wherein the network protocol includes the exchange of a plurality of handshake signals between the data processor and the data network and the protocol shim is arranged to delay and/or delete at least one of the handshake signals.

16. A data processor according to claim 14, wherein the network protocol includes the transmission of data in data packets and the protocol shim is arranged to delay and/or delete at least one of the data packets.

17. A data processor according to claim 16, wherein the network protocol further includes the transmission of a packet acknowledgement signal in response to the receipt by a data processor of a data packet and the protocol shim is arranged to delay and/or delete the packet acknowledgement signal.

18. A data processor according to claim 16, wherein the protocol shim is arranged to reduce the size of the data packets.

19. A data processor for use with a data network, the data processor comprising:
   network communication apparatus arranged to enable communication between the data processor and a data network;
   network communication monitoring apparatus arranged to detect a request to initiate communication between the data processor and the data network and to determine if the communication request conforms to one or more communication parameters; and
   communication control means arranged, in response to the detection of a communication request that does not conform to the at least one communication parameter, to delay the resultant communication between the data processor and the data network,
   wherein the network communication monitoring apparatus is arranged to generate a user notification if the number of detected communication requests failing to conform with the communication parameters in a given time period exceeds a threshold value.

20. A data processor for use with a data network, the data processor comprising:
   network communication apparatus arranged to enable communication between the data processor and a data network;
   network communication monitoring apparatus arranged to detect a request to initiate communication between the data processor and the data network and to determine if the communication request conforms to one or more communication parameters; and
   communication control means arranged, in response to the detection of a communication request that does not conform to the at least one communication parameter, to delay the resultant communication between the data processor and the data network,
   wherein the network communication monitoring apparatus is arranged to periodically update the communication parameters.

21. A data network comprising a plurality of data processors, each data processor comprising a communications unit such that each data processor is capable of communications with at least one other of the data processors comprising the data network, wherein at least one of the data processors comprises a data processor according to claim 10.

22. A system of controlling communications in a data network, the system comprising:
   means for detecting a request to initiate communication between a data processor and the data network;
   means for determining if the communication request is abnormal and if so controlling the data processor so as to delay the resultant communication between the data processor and the data network; and
   means for generating a user notification if the number of detected communication requests failing to conform with the communication parameters in a given time period exceeds a threshold value.

* * * * *